United States Patent
Bird et al.

(10) Patent No.: US 6,353,833 B1
(45) Date of Patent: *Mar. 5, 2002

(54) CACHING OF DISTRIBUTED DYNAMIC SQL STATEMENTS IN A MULTIPLE NODE RDBMS

(75) Inventors: Paul M. Bird, Toronto; Michael J. Snowbell, Thornhill, both of (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,165

(22) Filed: Sep. 29, 1998

(51) Int. Cl.$^7$ ................................................ G06F 17/30
(52) U.S. Cl. .............................. 707/201; 707/8; 707/10
(58) Field of Search .......................... 707/2, 8, 10, 102, 707/201; 709/203

(56) References Cited

U.S. PATENT DOCUMENTS

| | | | | |
|---|---|---|---|---|
| 5,136,707 A | * | 8/1992 | Block et al. ................. 707/201 |
| 5,283,894 A | * | 2/1994 | Deran ............................ 707/1 |
| 5,544,345 A | * | 8/1996 | Carpenter et al. ........... 711/150 |
| 5,559,984 A | * | 9/1996 | Nakano et al. ............. 711/121 |
| 5,848,241 A | * | 12/1998 | Misinai et al. .............. 709/213 |
| 5,897,634 A | * | 4/1999 | Attaluri et al. ................ 707/8 |
| 5,924,096 A | * | 7/1999 | Draper et al. ................ 707/10 |
| 5,974,129 A | * | 10/1999 | Bodnar ........................ 379/207 |
| 5,987,499 A | | 11/1999 | Morris et al. ............... 709/203 |
| 6,073,129 A | * | 6/2000 | Levine et al. ................. 707/4 |
| 6,115,703 A | * | 9/2000 | Bireley et al. ................. 707/2 |
| 6,243,719 B1 | * | 6/2001 | Ikuta et al. ................. 707/204 |

OTHER PUBLICATIONS

Attaluri et al., "Concurrency Control of Large Unstructured Data,"IEEE, 1998, Proc. 31$^{st}$ Annual Hawaii Intl. Conf. on System Sci., pp. 314–323.

Thomas et al., "Heterogenous Distributed Database systems for Production Use," ACM Computing Surveys, v.22, No. 3, Sep. 1990, pp. 237–266.

* cited by examiner

*Primary Examiner*—Jean R. Homere
(74) *Attorney, Agent, or Firm*—Prentiss W. Johnson; Daniel E. Johnson

(57) ABSTRACT

A method and system for caching dynamic SQL statements and their sections at different nodes in a multiple node Relational Database Management System (RDBMS) while maintaining cache and application integrity across all nodes. Each node in the RDBMS having a global cache shared by all applications on that node. One of the nodes in the RDBMS being a catalogue node which controls access to a database. The catalogue node maintaining a list of participating nodes that have requested access to the database controlled by the catalogue node. The list of participating nodes being used to notify each participating node of any changes to the database that may affect the validity of a dynamic SQL statement stored in the global cache of the node.

6 Claims, 6 Drawing Sheets

CACHING OF DISTRIBUTED DYNAMIC SQL STATEMENTS IN A MULTIPLE NODE RDBMS

FIELD OF THE INVENTION

This invention relates to relational database management systems (RDBMS) and more particularly to a method for caching dynamic SQL statements (and their sections) at different nodes in a multiple node database while maintaining cache and application integrity across all nodes.

BACKGROUND OF THE INVENTION

Structured Query Language (SQL) is the database access language most commonly used to access relational databases (such as the DB2 product sold by IBM Canada Ltd.) in an open, heterogeneous environment. Although this disclosure refers to the DB2 relational database product sold by IBM, individuals skilled in the art will recognize that the caching of database access statements is applicable to any relational database management system (RDBMS).

Within this specification including the claims, the following terms will be used:

Access Plan An access plan is the method(s) chosen by the SQL Compiler to satisfy an application request as stated in the form of an SQL statement.

Agent A process used by a RDBMS to provide services for an application request.

Node A node is a physical entity (eg. a processor and memory) that is used to process application requests to the RDBMS and contains some or all of the database. A serial version of the RDBMS contains at most 1 node, while a parallel version of the RDBMS can contain 1 or more nodes.

Package A package is associated with an application and contains the information required by the RDBMS for all SQL statements defined in that application. The information in a package consists of a collection of sections and the compilation environment settings (e.g. compile or binding options) used to compile any static SQL statements; some of these same settings are also used as the default environment for any dynamic SQL statements compiled by the application during execution.

Section A section contains all the information required by the RDBMS to execute the chosen access plan for an SQL statement. A section is the compiled version of the access plan chosen by the SQL compiler.

Section Entry A section entry contains information about a specific section as well as the SQL statement corresponding to that section.

There are two basic types of SQL statements, static and dynamic. In using static SQL the user embeds SQL requests for data in an application program. An SQL precompiler removes these statements from the application program and replaces them with function calls whose parameters indicate a specific section entry for the package corresponding to the current source file. The removed SQL statement is then sent to DB2 for compilation. Compiling (also known as preparing) a SQL statement is the process by which the DB2 SQL compiler chooses and builds an access plan to efficiently resolve the SQL statement. The access plan is saved in its executable format, a section, in the system catalogues.

The parsing of the statement and building of the access plan can be relatively long and complicated. Compilation of static SQL improves run time performance by building the access plan before the application is executed.

Dynamic SQL is generally used for ad hoc SQL requests. For example, in a database used to track sales of individual products, a dynamic SQL query may be invoked to list the top ten products sold, by sales region. Depending upon the nature of a dynamic SQL request, the time required to parse it and create an access plan to satisfy the user request can be significant. Further, if the dynamic SQL request is repeated later in the application by the same agent or perhaps by a different agent, a new access plan must be created in each instance. Thus, the creation of an identical access plan may often have to be repeated, thereby impacting performance of the application.

A dynamic SQL request originates on the node running an application and may require data from one or more other nodes (the remote nodes). In such a scenario, the prior art solution is to generate the section to obtain the data from the remote node(s) and send the section to the remote node(s) for execution. The inventors are not aware of any solution proposed to date which considers allowing caching of the same statement across multiple nodes, thus not requiring the section to be executed to be shipped. Maintaining multiple iterations on multiple nodes results in less communications traffic and faster response times for remote parts of a dynamic SQL request due to faster startup times.

SUMMARY OF THE INVENTION

In accordance with the present invention there is provided a database system comprising:
 a) a plurality of nodes;
 b) a plurality of databases stored on the nodes; and
 c) a global cache stored on at least one node, the global cache being accessible to a plurality of applications in the database system.

In accordance with the present invention there is also provided a method of maintaining cache and application integrity across a relational database system comprising a plurality of nodes and a plurality of databases shared on the nodes, the method comprising the steps of: (a) providing, for at least some of the databases, a global cache including information to enable agents to access the databases, (b) originating a request through a coordinating node, the coordinating node sending information on the variation to be executed to remote nodes; (c) having each remote node receive the request and check the global cache on the respective remote node for a current variation; and (d) if the a remote node does not have the current variation, the remote node requesting the coordinating node to send the current version of the variation.

BRIEF DESCRIPTION OF THE DRAWINGS

Reference will now be made, by way of example, to the accompanying drawings which show a preferred embodiment of the present invention and in which.

DETAILED DESCRIPTION OF THE PREFERRED EMBODIMENT

Figure 1:
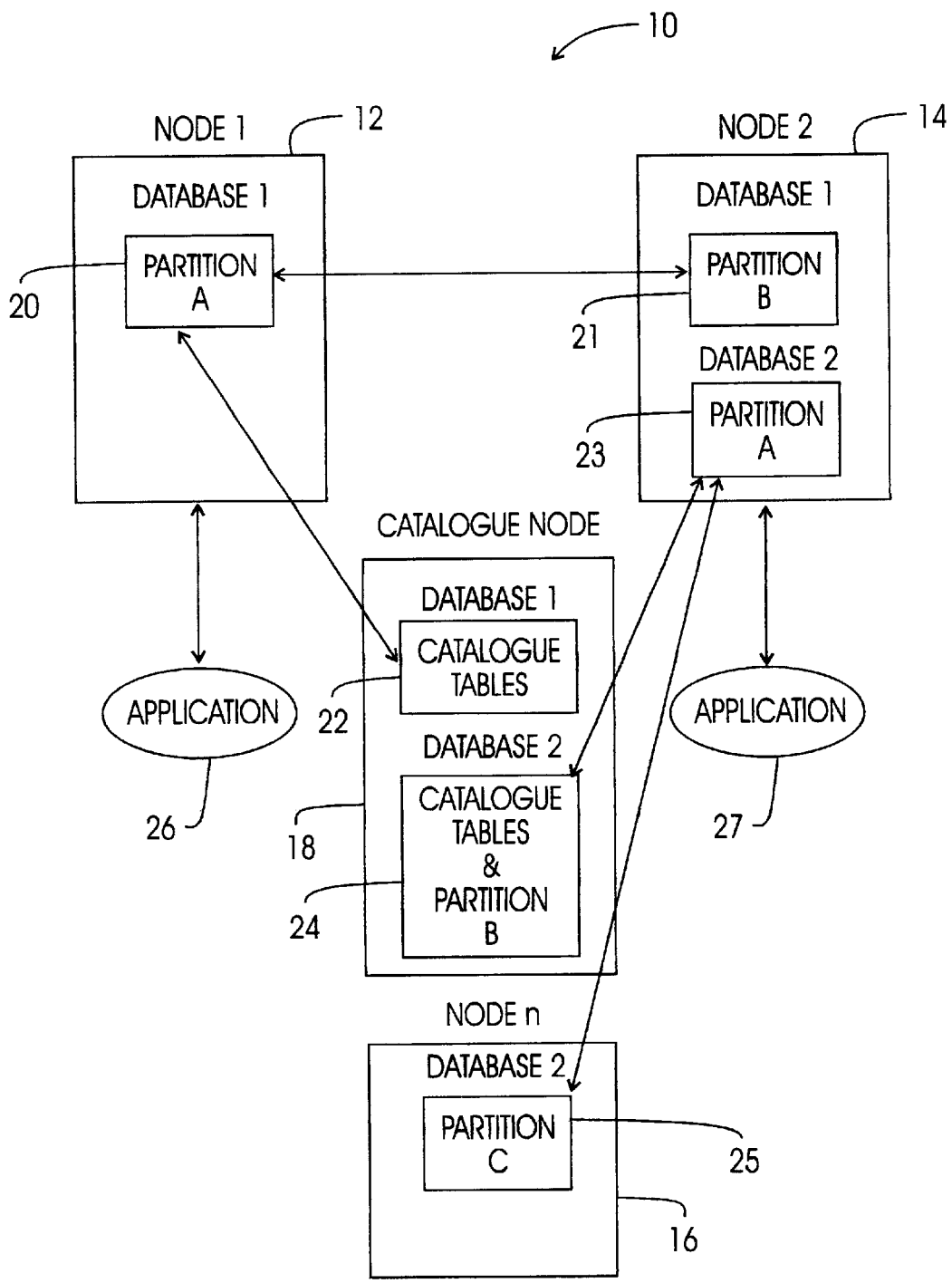
FIG. 1 is a conceptual diagram of a Relational Database Management System.

FIG. 1 is a conceptual diagram of a Relational Database Management System (RDBMS) 10. The RDBMS of 10 of FIG. 1 illustrates only one of many configurations available in an RDBMS and is intended only to show a networked system that may utilize the present invention. In the configuration as shown, RDBMS 10 contains a plurality of nodes (12, 14, 16, 18). Each node (12, 14, 16, 18) may contain a partition or all of a database. In the example of FIG. 1, the RDBMS has two databases, although any number of databases can be provided, the content of which is partitioned among the plurality of nodes. The first of these databases is divided into a partition 20 and a partition 21. The catalogue 22 for this first database is stored on catalogue node 18. The catalogue 22 contains tables in which resides all the "meta-data" such as the structure, tables packages and functions relating to the first database. The second database is divided into partitions 23, 24 and 25. Note that in the illustrated example, the partition 24 of the second database also contains the catalogue tables for the second database. Thus, a catalogue node 18 may contain data as well as catalogue tables. Catalogue tables are per database and can be located at different nodes for different databases. This means that the term "catalogue node" is relative per database, i.e. the catalogue could reside on any node.

Figure 2:
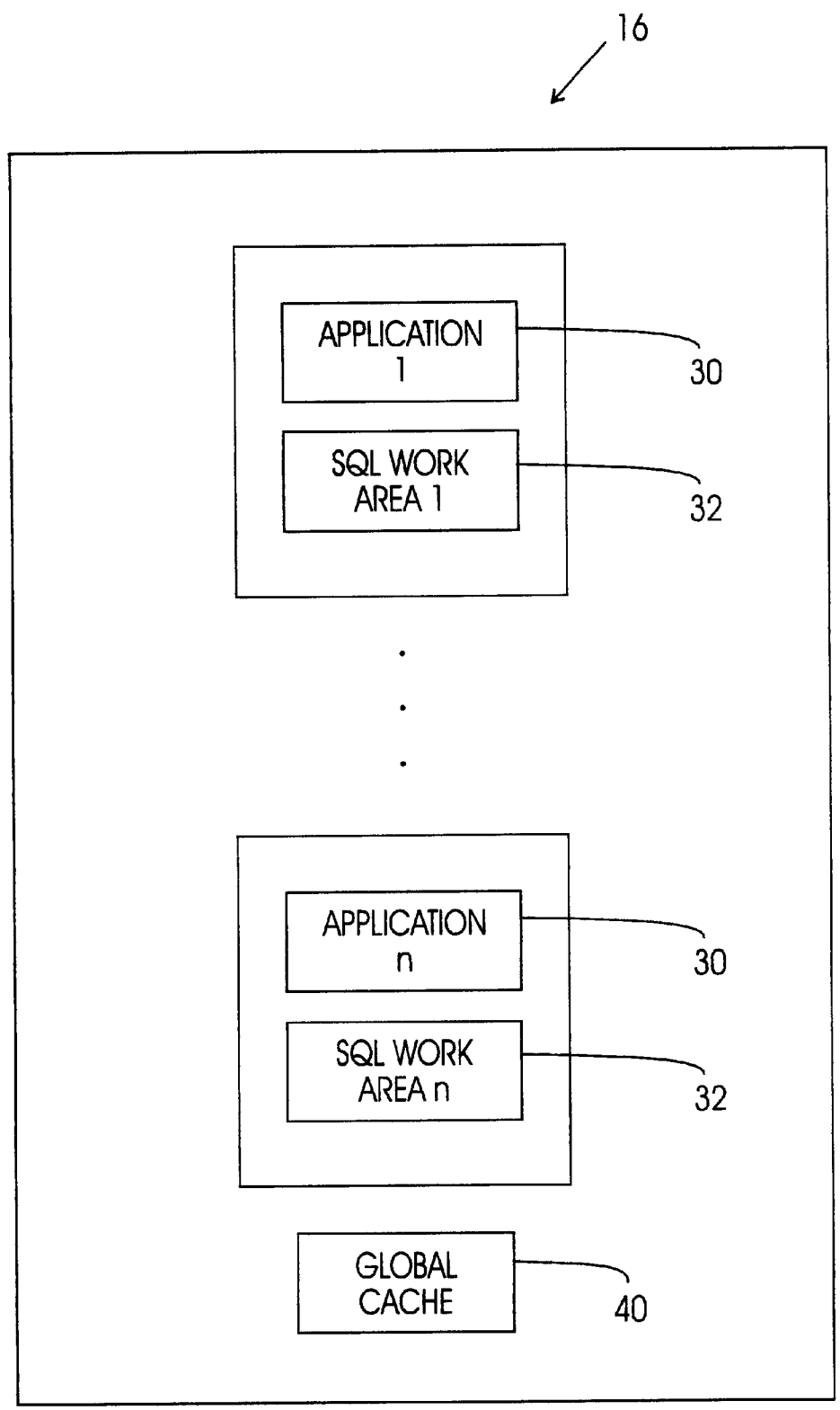
FIG. 2 is a conceptual diagram of a node of the Relational Database Management System of FIG. 1.

FIG. 2 illustrates one scenario of the activity that may occur on any node of the system and, by way of example, the node 16 of the RDBMS system 10 of FIG. 1 is shown. Node 16 may contain any number of applications 30, each accessing data from the database(s) to which the node is connected. Each application 30 has a respective SQL work area 32. Also contained within node 16 is a global cache 40 in accordance with the present invention which is shared by all applications on all the nodes.

The Global Cache

The global cache 40 acts as a repository for package and section information for static SQL and statement and section information for dynamic SQL as detailed below.

In the preferred embodiment, the global cache is kept at the database level, and is accessible to all agents for a database at a particular node of the database (physical or logical). It is allocated from the same memory set as other database-level entities, such as the lock list or buffer pool; it is created when the database is initialized, and it remains active until the database is shut down. The global cache acts like a "public" library for all the agents using the database at a given node. Agents simply copy the package information and the modifiable portions of the sections (e.g. buffers and flags).

Figure 3:
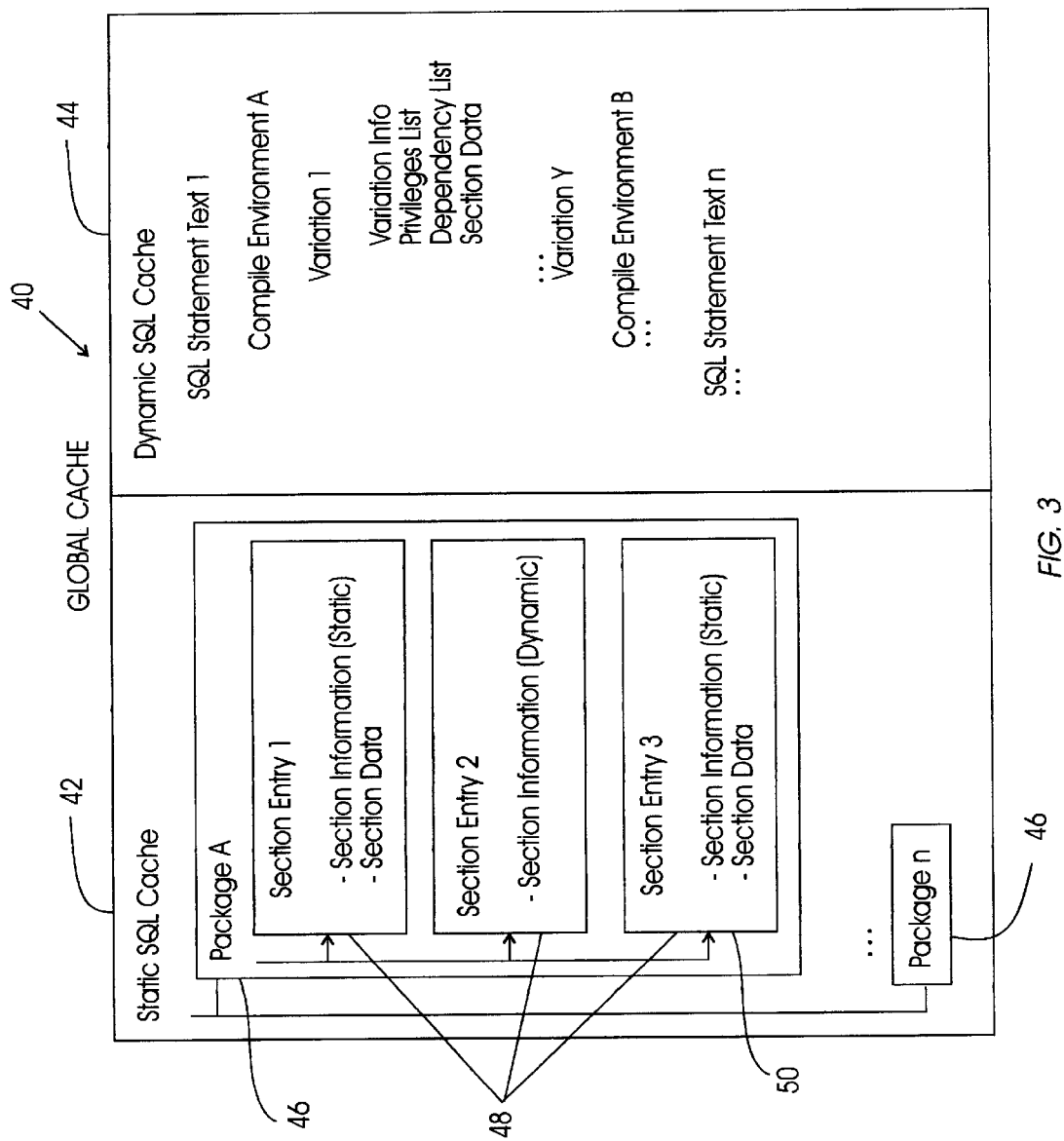
FIG. 3 is a conceptual diagram of the global cache.

Referring to FIG. 3, the global cache 40, consists of two logical areas: the static SQL cache 42 and the dynamic SQL cache 44. The static cache 42 contains the information for packages 46, section entries 48, and static SQL sections 50. The dynamic SQL cache 44 contains the information and sections for dynamic SQL statements.

Figure 4:
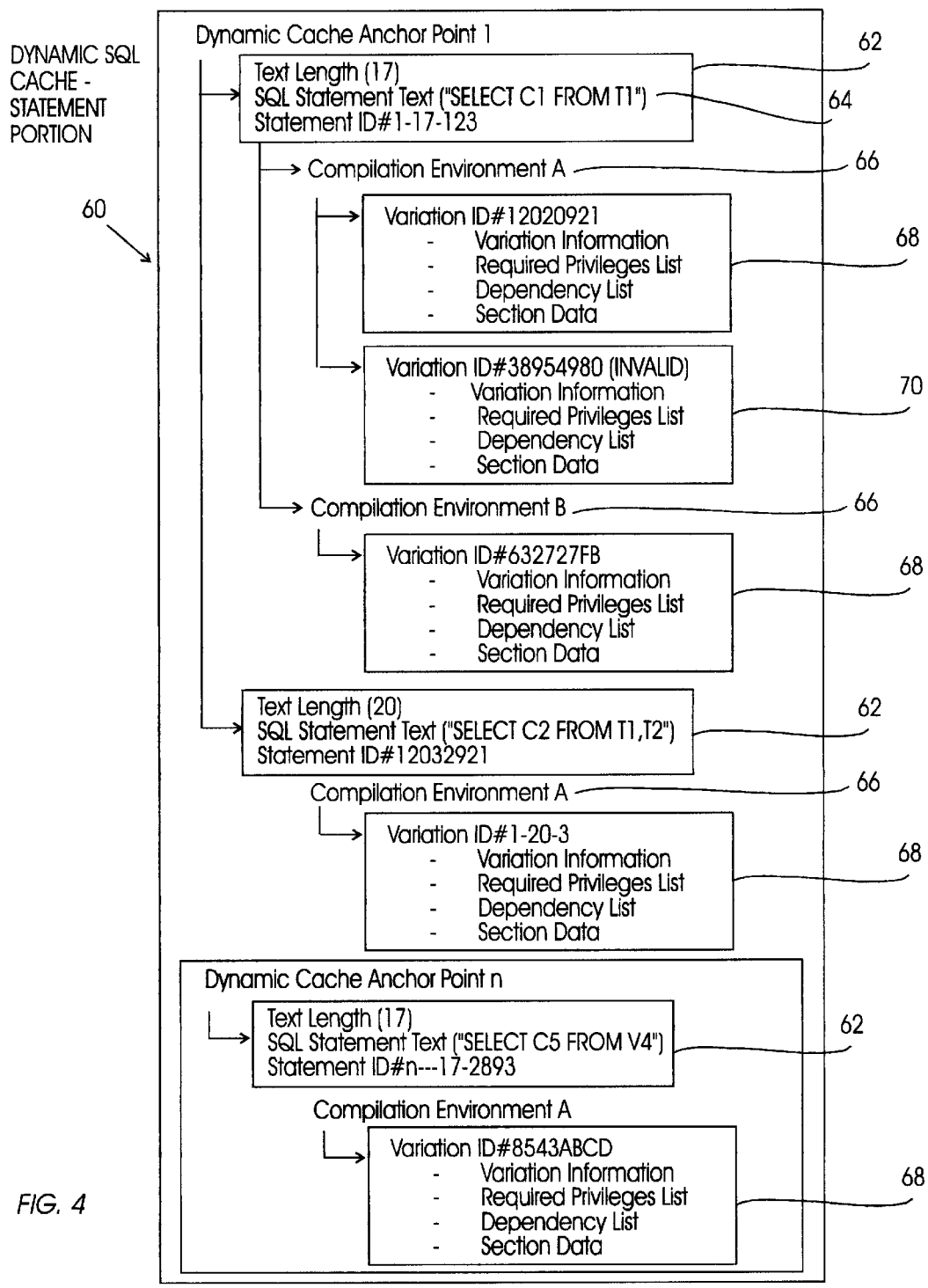
FIG. 4 is a conceptual diagram of the statement portion of the dynamic cache portion of the global cache.
Figure 5:
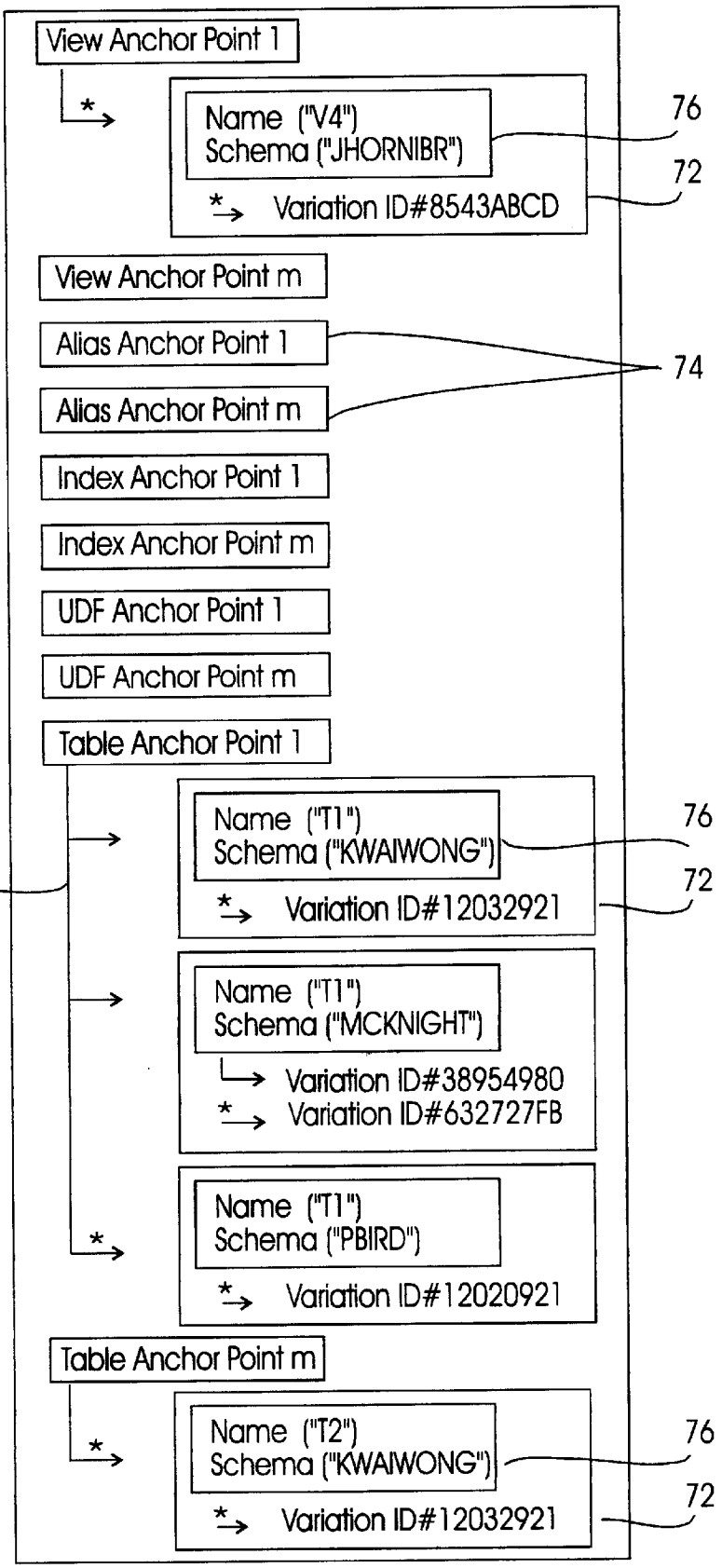
FIG. 5 is a conceptual diagram of the dependency portion of the dynamic cache portion of the global cache.

The dynamic SQL portion 44 of the global cache 40 is subdivided into two portions: the statement portion 60 (FIG. 4) and the dependency portion 58 (FIG. 5). The statement portion 60 contains SQL statement entries 62 which contain the text of the cached dynamic SQL statements 61 as well as the different sections compiled for each SQL statement. The statement portion 60 of the dynamic cache 11 is used to support application requests to prepare the dynamic SQL statement 64 and obtain an executable section. The dependency portion 58 of the dynamic cache 44 contains entries for all the objects upon which the cached dynamic SQL sections are dependent. This information is used to support cached object invalidation due to data definition language statements and other database activities.

The primary structure of the dynamic SQL portion 11 of the global cache 40 is based upon the unique text for a give SQL statement 64, which is stored within SQL statement entry 62. A SQL statement entry 62 contains characteristic information about the SQL statement 64 that is determined once the first occurrence of the statement text 64 is compiled. This information is invariant since the statement text 64 is constant and these characteristics are inherent in the statement text 61 itself, independent of the environment in which it was compiled.

A section generated for the exact identical SQL statement text 64 is stored within the compilation environment 66. The compilation environment 66 contains information on the environment used to generate or compile the section. The compilation environment 66 contains all information not already contained in the catalogue tables, the influence or control an access plan created by the SQL compiler, and thus the section.

Below each compilation environment 66 are stored individual units known as "variations" 68. A variation 68 represents a unique section for the statement text 64, where the uniqueness is specified by the compilation environment 66 used to generate the section. The compilation environment 66 encompasses all those elements that affect the nature and result of the section generated by the SQL compiler for a dynamic SQL statement (e.g., special registers, relevant package compilation defaults, use of default qualifiers, use of function path, etc.). Note that since privileges do not affect the actual section generated, only whether it is allowed to be executed, the prerequisite privileges for a dynamic SQL statement 64 are irrelevant to the compilation environment 66. In the preferred embodiment, privileges are not part of the compilation environment 66.

A variation 68 is simply the representation of the fact that two applications issuing the same dynamic SQL statement 64 in the same context with the exact same compilation environment 66 should generate the exact same section, although the results of execution may differ due to actions within the individual units of work. For example, two applications using the same section for SELECT C1 FROM T1 may return different results if the first application has inserted some rows into T1 but not committed its changes. The first application will get the row returned by the section, but the second application may not.

In addition to the identifying compilation environment, each variation 68 under a statement entry 62 and compilation environment 66 also contains: the required privileges list of privileges needed to execute the section, the dependency list for the section and the section generated for the specified compilation environment. The dependency list refers to those objects and entities in the catalogue tables required, either directly or indirectly, by the section for a variation 68. The dependency list is also used to determine whether the section is no longer valid when an object on the dependency list is dropped; if the variation 68 is in use at the time, the drop request is rejected. When a section is no longer valid, the variation 68 becomes an invalid variation 70 and must be regenerated. The dependency list functions in much the same manner as the package dependencies that are recorded for static SQL statements in the SYSCAT.PACKAGEDEP catalogue table of DB2. For static SQL the SYSPLANDEP table is scanned to locate packages dependent upon the affected object and the packages are invalidated. Details of the dependency list and its use to invalidate dynamic SQL sections is discussed below in the description of FIG. 5. The major exception is that the loss of privileges does not result in any variation 68 being marked as an invalid variation 70 since, as noted previously, privileges do not affect the contents of the section. Since a variation 68 represents a dynamic SQL statement, and dynamic SQL always reflects the current environment, other actions such as issuing the RUNSTATS command against a table or creating a new User Defined Function (UDF) can cause a variation to be marked invalid.

Each dynamic SQL statement entry 62 may have one or more compilation environments 66, but each compilation environment 66 may contain only one valid variation 68. An invalid variation 70 will be flushed from the cache during cache space management. For example, an ALTER TABLE statement can cause a variation 68 to become an invalid variation 70 in the dynamic cache 44 and will eventually be flushed from the dynamic cache 44.

Dynamic SQL always reflects the current environment, i.e. the section for a dynamic SQL statement always represents the choices the SQL compiler would make given the most current environment. This is why a dynamic SQL section is invalidated when a new index is added or statistics are updated. The sections are fine in the sense that they will work, but the environment has changed and the sections may not reflect new choices that the compiler might make.

Referring now to FIG. 5, the basic unit of the dependency portion 58 of the dynamic SQL cache 44 is the object 72. An object 72 represents a database object upon which a dynamic SQL variation 68 is dependent. Each object 72 is associated with one or more variations 68. Each object 72 in the dependency portion 58 of the global cache 40 is distinct and only one occurrence of the object 72 may appear at any one time. To facilitate access, each object 72 is associated with a specific object type anchor point 74 by hashing the qualified object name 76 to a unique anchor point 74. Once associated with an anchor point 74, the object 72 is inserted into the list of objects 78 off that anchor point 74 in alphabetical order based on the object name 76 followed by the qualifier. Anchor points 74 are type specific (i.e. an alias anchor point only holds aliases) and only objects 72 of the type represented by the anchor point 74 are to be found off that anchor point 74. In the present embodiment, objects of types: view, alias, index, User Defined Functions (UDF), table, structured types, summary tables, hierarchies and pagesize are supported.

An essential characteristic of a dynamic SQL statement is that it reflects the current database environment and the dynamic SQL cache 44 does not alter this characteristic. If an environment change affects a dynamic SQL section, the variation 68 for that section will become an invalid variation 70. When invalidating a dynamic SQL variation 68 due to a change in a dependent object, the name of the affected object 76 is hashed to obtain the appropriate anchor point 74 for the same object type. The list of objects 78 is then scanned to find a matching object 72. Once a matching object 72 is found, the list of dependant variations below that object is scanned and an attempt is made to invalidate them.

Figure 6:
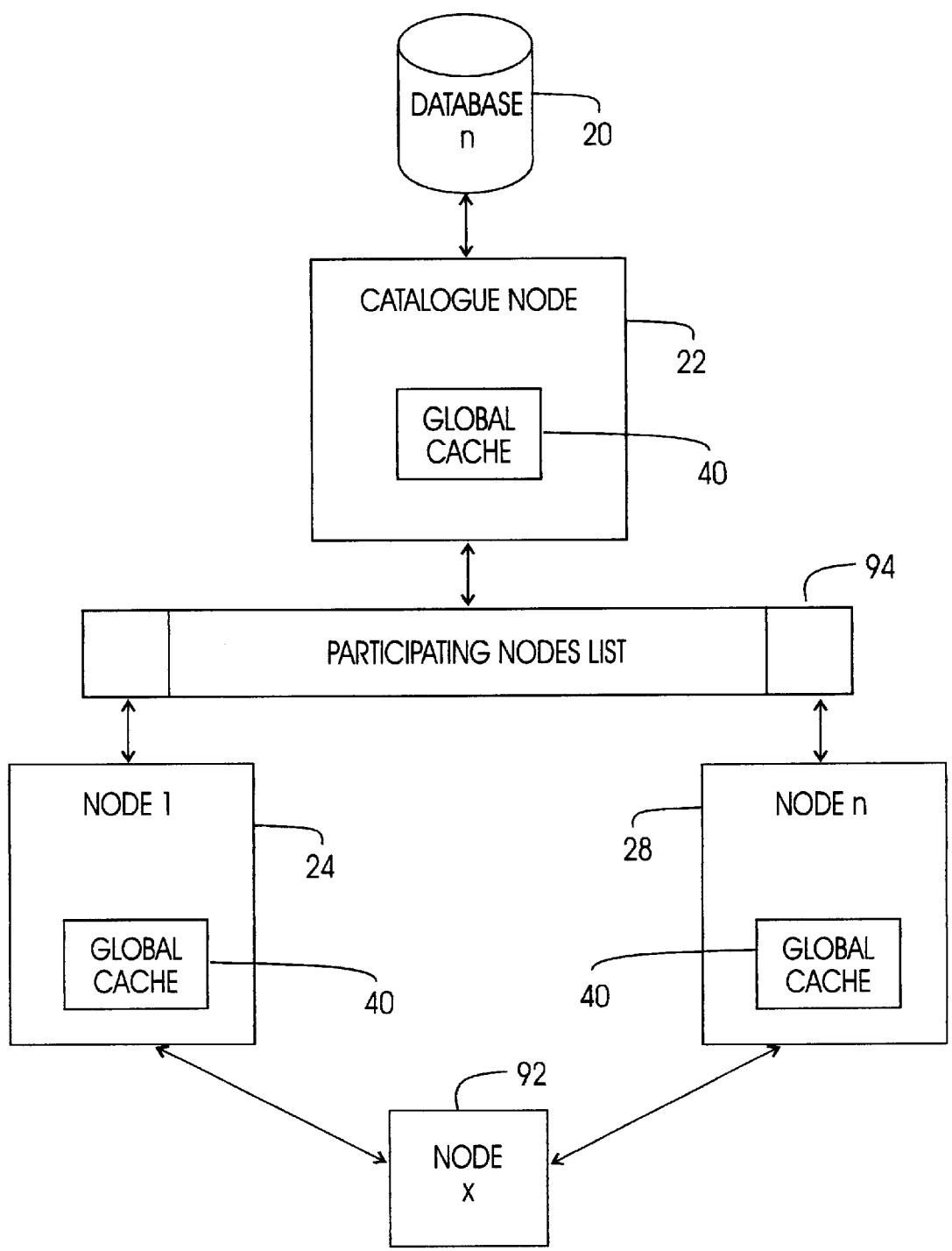
FIG. 6 is a conceptual diagram of a catalogue node, the participating nodes list and the participating nodes.

Referring now to FIG. 6, when a section needs to be executed at a remote node (24, 28), a request to execute the same variation as the current variation is sent to that node by a coordinator node 92. The coordinator node is responsible for coordinating all database requests made by an application on that node. When the remote node (24, 28) receives the request, the list of shipped variations contained within the global cache 40 is searched for a matching entry from the coordinator node 92. If none is found, then the remote node (24, 28) issues a request to the coordinator node 92 to send the specified variation and section to it. Along with the section, there is also sent the dependency information and required privileges information. When this information is received at the remote node (24, 28), it is inserted into the cache 40 at that node (24, 28) as a complete entry (i.e. as if it had originated at the remote node (24, 28); all information is in the cache including privileges and dependencies). At this point, the normal actions taken for invalidating events will process the transhipped variation just like any other in the remote node's (24, 28) cache 40.

The Participating Nodes List

In order to minimize network traffic and to allow for the ignoring of nodes that are either down or have not connected to a particular database, a list of participating nodes 94 for a database 20 is built and maintained on the catalogue node 22. A participating node is a node which is active, connected to the database 20 and has registered in the participating nodes list 92 at the database catalogue node 22.

The list of participating nodes 94 is used to define which nodes must be informed when a communication bulletin (described hereinbelow) is to be broadcast for a database 20. The information is broadcast to all nodes in the list of participating nodes 20 other than the current one (the catalogue node 22) by the agent wishing to send the information. Before any broadcast, the broadcasting agent must acquire the latch for the list of participating nodes 92 to prevent any new nodes from being added. Processing for the cache 40 at the catalogue node 22 is handled by the broadcasting agent.

Every time a node becomes active, a REGISTER request is sent to the catalogue node 22 to update the list of participating nodes 94 by adding an entry for this newly active node; the response to this request will contain the current values of all global relevancy counters (described hereinbelow) for the database 20. When a node becomes inactive, an UNREGISTER request is sent to the catalogue node 22 to remove the node from the participating nodes list 92.

When an action occurs that could invalidate any variation, an event broadcast is sent from the catalogue node 22 to all active nodes using all of the nodes in the participating nodes list 94 to ensure that all affected variations at all nodes are properly invalidated. If a node is not registered in the participating nodes list 94, then it has no global cache 40 and thus does not need to be informed of changes until it registers.

All information broadcasts for a database 20 must be done from the catalogue node 22 and use the list of participating nodes 94. If an error occurs during the broadcast, the transaction fails and is rolled back.

Dynamic SQL in a Parallel Environment

Dynamic SQL statements in a parallel environment require that the identical section be executed on all participating nodes. To ensure this behaviour, the coordinator agent (the agent dealing directly with the application) will place the needed identification for the variation to be executed in the request sent to each remote node, where a remote node is a node working for the application that is not the coordinator node. The remote nodes will request that this variation be loaded into their SQL Work Area (32 of FIG. 2, which will be in the application's common memory in most cases). The node's dynamic SQL cache 40 is then checked for this variation; if it is not there, a request is made to the coordinating node for a copy of the variation from that node which is inserted into the requesting node's dynamic SQL cache 40 upon receipt. Once loaded into the SQL Work Area (32 of FIG. 2), this section will be used by all agents executing in parallel for this application at this node. If the variation is not found at the coordinating node (or is not valid), an error will be returned to the requesting agent.

The shipped ID sent by the coordinating agent with the request to execute consists of the originating node, the statement ID and variation ID at the node of origin, and the insertion time of the variation into the global SQL cache at the node of origin as well as the specific subsection to be executed. A subsection is a logical sub-component of a section. Requests are made to different agents specifying different subsections. The insertion time is required to ensure the identical variation is used at all nodes as the one specified by the coordinator node in its request. No check on the validity of the variation is performed as it is assumed to be still protected by the coordinator node; however, the status of the variation inserted in to the local node's global SQL cache will be identical to its value at the node of origin (e.g. an invalid variation will be inserted as invalid and marked as such).

Since the specified variation is from another node, it may or may not exist at the current node and if it does exist at the current node, it will have a different variation ID. To help map from shipped IDs to valid variation IDs at a node, a list of shipped IDs and the associated variation ID at this node is linked from a control block (not shown) within the statement portion 60 of the global cache 40, to help agents find the desired variation quickly. Once the variation ID for this node is known, the variation is handled exactly like any other variation.

If a shipped ID is not found in the list, the variation is requested from the node of origin and inserted into the dynamic SQL cache of the requesting node. When the variation is requested, the following information will be sent to the requesting node in order to allow complete support of the shipped variation in the cache for the requesting node:

Statement Length
Statement Text
Statement Information
Compilation Environment
Required Privileges List
Dependency List
Section Data
Relevancy Counters In order to ensure that database changes are recognized and communicated to all agents working on a database in a simple yet effective manner, a number of relevancy counters are used. Relevancy counters are a simple method of determining whether past decisions or cached information are still relevant in the current environment. When an object is cached or a privilege is checked, the value of the appropriate relevancy counter is stored at that time. When the cached object or decision point is next revisited, the stored value is compared to the current value. If they are the same, then the old object or decision is still valid, else it must be revisited. Relevancy counters are only meaningful to coordinator agents. There are two types of relevancy counters; those based on global, shared database information, and those focussed on application/connection information.

The following counters are global across the database and are maintained at the catalogue node.

Database Privileges Counter
Reflects revocation actions against the SYSDBAUTH catalogue table.
Package Privileges Counter
Reflects revocation against the SYSPLANAUTH catalogue table.
User Privileges Counter
Reflects revocation actions against the SYSUSERAUTH catalogue table.
Statistics Iteration Counter
Reflects changes to statistical information either through an Update Statistics statement or a call to RUNSTATS Any change to the value of one of these counters must be broadcast to all nodes of the database in order to ensure database and application relevancy.

The following counters are unique to a specific application and are only referenced or updated by the coordinating agent. They are used to determine if a new compilation environment exists for the application or whether any SQL statements being compiled are possibly dependent on uncommitted Data Definition Language (DDL) performed by the application in this Unit of Work.

Compilation Environment Counter
Reflects changes in the application compilation environment for dynamic SQL that affect the compilation environment used to select variations. An example would be if the application issued a SET CURRENT SCHEMA statement which changes the default qualifier to be used for unqualified object references in any future dynamic SQL statements issued by the application.
DDL in UOW Counter
Reflects the existence of DDL actions by the application within the current unit of work.

These counters are kept with other application information that is shared by all agents working for that application. These counters are used to determine if a new variation is required during a unit of work due to DDL or SRT statements issued by the applications since the beginning of current unit of work.

Invalidation of a Variation

A variation for a dynamic SQL statement can become invalid for a number of reasons, some of which relate to a change in the compilation environment in which the variation was created. Since dynamic SQL must reflect all changes in the compilation environment, as these changes occur a variation may become invalid and be eligible to be flushed from the dynamic SQL cache.

All invalidating events are broadcast from the catalogue node to participating nodes once the invalidation event has occurred: i.e. the invalidation event is broadcast as part of the processing for an invalidation event.

Inter-node Communication Messages

There are a number of cache synchronization messages used to pass information between global SQL caches on different nodes. Synchronization messages are used to inform the cache at a node that a change has been made to the database environment and action needs to be taken to ensure the cache at this node remains relevant to the current environment. Upon receipt of a synchronization message that affects cached dynamic SQL statements, the receiving node will search the dependency portion 58 of the dynamic SQL cache 44 to determine which variations, if any, are affected by the message contents; these variations are invalidated. Upon receipt of a message affecting a cached package, the receiving node will perform the indicated action on the specified package.

The format of a synchronization message is:
Node of Origin
Application ID
Originating Agent ID
Event Class
Update package privilege counters
Flush package from cache (Exclusive Lock and remove from cache)
Invalidate package in cache (Exclusive Lock and set package status to INVALID)
Inoperate package in cache (Exclusive Lock and set package status to INOPERATE)

Invalidate dynamic SQL—Hard (Exclusive access on each variation affected and invalidate the variation)
Invalidate dynamic SQL—Soft (Invalidate the variation)
Update user privilege counters
Update db auth privilege counters
Temporary tablespace DDL—Soft (Invalidate the variation)
Temporary tablespace DDL—Hard (Exclusive access on each variation affected and invalidate the variation)
Object Type
Object Schema
Object Name
Object Usage
Object Column Information (if applicable)
Counter information (if applicable)

A synchronization message which is invalidating a package or cached dynamic SQL statements requires that the cache at the receiving node guarantee that all relevant cached packages or variations are locked exclusively for the requesting application. Once the appropriate action has been taken for a synchronization message, the receiving node(s) must respond to the requesting node with a confirmation message with a success or failure indicator.

Since all DDL actions take place at the catalogue node, the catalogue node will be the source of all synchronization messages. All messages will be sent to all participating nodes except the current one (the catalogue node) as the cache at the current node will be manipulated directly. If a communication failure occurs during a transmission to a participating node, the sending function fails and the transaction is rolled back. Any other errors will also halt processing and cause the transaction to be rolled back.

What is claimed is:

1. A database system, comprising:

a plurality of nodes;

a plurality of databases stored on the nodes; and a global cache stored on at least one node, the global cache being accessible to a plurality of applications in the database system, wherein the global cache comprises a static portion and a dynamic portion, the dynamic portion of the global cache including a plurality of variations, the database system including a catalogue node, the catalogue node comprising a list of participating nodes that are active and connected to the database system.

2. A database system as claimed in claim 1, wherein the static portion of the global cache comprises one or more packages, and one or more section entries within each of said packages; and wherein the dynamic portion of the global cache comprises a statement portion and a dependency portion.

3. A method of maintaining cache and application integrity across a relational database system comprising a plurality of nodes and a plurality of databases shared on the nodes, the method comprising:

(1) providing, for at least some of the databases, a global cache including information to enable agents to access the databases;

(2) originating a request through a coordinating node, the coordinating node sending information on the variation to be executed to remote nodes;

(3) having each remote node receive the request and check the global cache on the respective remote node for a current variation; and (4) if the remote node does not have the current variation, the remote node requesting the coordinating node to send the current version of the variation, the method including providing a catalogue node and maintaining, on the catalogue node, a list of participating nodes that are active and connected to the database system, and broadcasting a communication bulletin from the catalogue node to the nodes on the list of participating nodes when a change occurs to an object in the database that may invalidate a variation.

4. The method as claimed in claim 3, the method including:

(1) the catalogue node receiving a REGISTER request when a node becomes active and updating a list of participating nodes by adding an entry for the newly entered node, and (2) the catalogue node receiving an UNREGISTER request when a node becomes inactive and removing that node from the participating nodes list.

5. The method as claimed in claim 4, the method including broadcasting a communication bulletin from the catalogue node to nodes on the list of participating nodes to ensure that all affected variations and all nodes are properly invalidated.

6. The method as claimed in claim 5, the method comprising:

(a) verifying if a section requested to be executed is valid and executing such section or (b) if such section requested to be executed is invalid, requesting a valid section from the coordinating node and executing such section upon receipt of the same from the coordinating node.

* * * * *